US009512281B2

(12) United States Patent
Bibette et al.

(10) Patent No.: US 9,512,281 B2
(45) Date of Patent: *Dec. 6, 2016

(54) PROCESS FOR PREPARING A MASTERBATCH IN THE LIQUID PHASE (75) Inventors: Jérôme Bibette, Paris (FR); Fernando Martinez Pedrero, Madrid (ES); Benoît De Gaudemaris, Clermont-Ferrand (FR); Julien Berriot, Clermont-Ferrand (FR)

(73) Assignees: COMPAGNIE GENERALE DES ESTABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 182 days.

This patent is subject to a terminal disclaimer.

(21) Appl. No.: 13/997,458

(22) PCT Filed: Dec. 21, 2011

(86) PCT No.: PCT/EP2011/073662
§ 371 (c)(1),
(2), (4) Date: Sep. 9, 2013

(87) PCT Pub. No.: WO2012/085135
PCT Pub. Date: Jun. 28, 2012

(65) Prior Publication Data
US 2013/0345348 A1   Dec. 26, 2013

(30) Foreign Application Priority Data
Dec. 23, 2010 (FR) .................................. 10 61182
Apr. 15, 2011 (FR) .................................. 11 53318

(51) Int. Cl.
C08J 3/22 (2006.01)
B60C 1/00 (2006.01)
C08C 1/14 (2006.01)
C08K 3/36 (2006.01)

(52) U.S. Cl.
CPC .............. C08J 3/22 (2013.01); B60C 1/0016 (2013.04); C08C 1/14 (2013.01); C08J 3/226 (2013.01); *C08J 2407/02* (2013.01); *C08J 2409/02* (2013.01); *C08J 2409/10* (2013.01); *C08J 2415/02* (2013.01); *C08K 3/36* (2013.01)

(58) Field of Classification Search
CPC ............ B60C 1/0016; C08C 1/14; C08J 3/22; C08J 3/226
USPC .......................... 523/333, 351; 524/492, 495
See application file for complete search history.

(56) References Cited

U.S. PATENT DOCUMENTS

| 5,763,388 A | 6/1998 | Lightsey et al. |
| 5,977,238 A | 11/1999 | Labauze |
| 6,013,718 A | 1/2000 | Cabioch et al. |
| 6,503,973 B2 | 1/2003 | Robert et al. |
| 6,815,473 B2 | 11/2004 | Robert et al. |
| 7,211,625 B2 * | 5/2007 | Tsuji ..................... C08F 293/00 525/330.3 |
| 9,145,489 B2 * | 9/2015 | Bibette ................ C08K 5/5406 |
| 2002/0086917 A1 * | 7/2002 | Chung et al. .................. 523/351 |
| 2006/0089445 A1 | 4/2006 | Gandon-Pain |
| 2010/0022684 A1 * | 1/2010 | Wallen ..................... C08J 3/215 523/334 |

FOREIGN PATENT DOCUMENTS

| BE | 541816 | 10/1955 |
| EP | 1 127 909 A1 | 8/2001 |
| EP | 1 834 980 A1 | 9/2007 |
| EP | 1 834 985 A1 | 9/2007 |
| FR | 2 740 778 A1 | 5/1997 |
| FR | 2 765 882 A1 | 1/1999 |
| FR | 2 845 931 A1 | 4/2004 |
| JP | 2007-224067 | * 9/2007 |
| JP | 2007-224067 A | 9/2007 |
| JP | 2010-189511 A | 9/2010 |
| WO | WO 97/36724 A2 | 10/1997 |
| WO | WO 01/92402 A1 | 12/2001 |
| WO | WO 02/10269 A2 | 2/2002 |
| WO | WO 03/016837 A1 | 2/2003 |
| WO | WO 2004/096865 A2 | 11/2004 |
| WO | WO 2006/069792 A1 | 7/2006 |
| WO | WO 2006/069793 A1 | 7/2006 |
| WO | WO 2008/141702 A1 | 11/2008 |
| WO | WO 2009/000750 A1 | 12/2008 |
| WO | WO 2009/000752 A1 | 12/2008 |

OTHER PUBLICATIONS

Kao Global Chemicals; Demol N datasheet (1994).*
International Search Report (PCT/ISA/210) issued on Mar. 9, 2012, by the European Patent Office as the International Searching Authority for International Application No. PCT/EP2011/073662.
Written Opinion (PCT/ISA/237) Issued on Mar. 9, 2012, by the European Patent Office as the International Searching Authority for International Application No. PCT/EP2011/073662.

* cited by examiner

*Primary Examiner* — Edward Cain
(74) *Attorney, Agent, or Firm* — Dickinson Wright PLLC (57) ABSTRACT

The invention relates to a process for the preparation of a masterbatch in the liquid phase based on one or more diene elastomer latexes and on one or more fillers, comprising the following successive stages:
preparation of a stable and homogeneous aqueous dispersion by mixing
one or more diene elastomer latexes with
one or more stable aqueous dispersions of one or more fillers, the said fillers;
homogenization of the aqueous dispersion,
coagulation within the aqueous dispersion of the said diene elastomer latex or latexes with the filler or fillers by supplying mechanical energy,
recovery of the coagulum,
drying the recovered coagulum in order to obtain the masterbatch.

11 Claims, 1 Drawing Sheet

PROCESS FOR PREPARING A MASTERBATCH IN THE LIQUID PHASE

BACKGROUND

1. Field

The invention relates to a process for the preparation of a masterbatch in the liquid phase of one or more diene elastomers, in particular a natural rubber latex, and of one or more fillers.

2. Description of Related Art

The term "masterbatch" is understood to mean an elastomer-based composite into which one or more fillers and optionally other additives has/have been introduced.

It is known that, in order to obtain the optimum reinforcing properties conferred by a filler in a tire tread and thus a high wear resistance, it is advisable generally for this filler to be present in the elastomeric matrix in a final form which is both as finely divided as possible and as homogeneously distributed as possible. In point of fact, such conditions can only be achieved in so far as this filler exhibits a very good ability, on the one hand, to be incorporated in the matrix during the mixing with the elastomer and to deagglomerate and, on the other hand, to disperse homogeneously in this matrix.

In point of fact, in order to improve the dispersibility of the filler in the elastomeric matrix, it is known to resort to a mixing of elastomer and filler in the "liquid" phase. In order to do this, recourse is had to an elastomer in the latex form and to an aqueous dispersion of the filler, commonly referred to as "slurry".

The process for the preparation of the masterbatch in the liquid phase comprises a coagulation stage which is generally initiated by the addition of coagulating agent to the medium. U.S. Pat. No. 5,763,388 teaches a process for the preparation in the liquid phase of a masterbatch of a polymer latex and of silica as filler, comprising the incorporation within the latex of a modified silica. This silica has reacted beforehand with a coupling agent, this modification to the silica making it possible to uniformly disperse the modified silica within the polymer latex. According to this document, the coagulation stage is carried out in the presence of a coagulating agent.

The filler can also be carbon black. In this field, the problem of the uniform dispersion of the fillers and in particular carbon black within the rubber had already been posed from 1955. Thus, there is known, from the document BE 541816, a process for the preparation of a masterbatch of rubber and of carbon black in the liquid phase. This process is carried out continuously and uses hydraulic impacts or intense mechanical stirring to bring about the dispersion of the carbon black within the elastomeric matrix.

More recently, the document WO97/36724 discloses a process for the preparation of a masterbatch and a specific apparatus which makes it possible to improve the dispersibility of the carbon black in a natural rubber latex. This technology meets two objectives: the coagulation stage is carried out in the absence of coagulating agent and a masterbatch having a uniform distribution of the filler is obtained. However, this technology exhibits a number of disadvantages. The apparatus employed is extremely complex and the process described is based on very precise characteristics related to this apparatus, such as a defined geometry of the coagulation zone or also a defined difference in flow rate.

SUMMARY

Thus, a process for the preparation of a masterbatch is being sought for which results in a masterbatch which exhibits a uniform distribution of the filler throughout the product, which exhibits a satisfactory yield by weight and which exhibits a satisfactory filler/elastomer ratio, this process having to be easy to carry out using simple equipment.

Furthermore, it would be advantageous to be able to exhibit better control over, indeed even to be in command of, the homogenization and coagulation phases, so as to be able to influence the distribution of the filler within the coagulum.

In point of fact, the Applicant Companies have discovered that it is possible to control the homogenization of the mixture of the elastomer and filler before the coagulation phase, thus making it possible to improve the distribution of the fillers in the elastomeric matrix and to bring about the participation of all the fillers present in the matrix, thus resulting in a very good yield by weight while observing the content of filler previously introduced.

Advantageously, the process according to the invention does not require the use of a coagulating agent.

The invention thus relates to a process for the preparation of a masterbatch in the liquid phase based on one or more diene elastomer latexes and on one or more fillers, comprising the following successive stages:

preparation of a stable and homogeneous aqueous dispersion (C) by mixing
one or more diene elastomer latexes (A) with
one or more stable aqueous dispersions (B) of one or more fillers,
homogenization of the aqueous dispersion (C),
coagulation within the aqueous dispersion (C) of the said diene elastomer latex or latexes with the fillers by supplying mechanical energy,
recovery of the coagulum, then
drying the recovered coagulum in order to obtain the masterbatch.

The invention also relates to a masterbatch of diene elastomer and of filler prepared according to the process described above.

Another subject-matter of the invention is a rubber composition based on at least one masterbatch of diene elastomer and of filler prepared according to the process described above, a finished or semifinished article comprising a composition as defined above and a tire tread comprising a composition as defined above.

Finally, a subject-matter of the invention is a tire or semifinished product comprising at least one rubber composition as defined above.

DETAILED DESCRIPTION OF SPECIFIC EMBODIMENTS

Other subject-matters, characteristics, aspects and advantages of the invention will become even more clearly apparent on reading the description and examples which follow.

The term "homogeneous" is understood to mean, within the meaning of the present invention and conventionally for a person skilled in the art, that the concentration of fillers and/or of elastomer latexes in a given volume is identical to the concentration of fillers and/or of latexes in the total volume of the masterbatch or dispersion.

A person skilled in the art will know how to confirm the homogeneity of the dispersion, if need be, by measurements of concentration of the filler and/or of the elastomer latex using several samples withdrawn at different points of the volume (for example at the surface or deeper in the vessel) of the dispersion.

The desired aim is avoid the formation of pockets of dispersion of fillers within the masterbatch, commonly known as agglomerates.

The expression: composition "based on", should be understood as meaning a composition comprising the mixture and/or the reaction product of the different constituents used, some of these base constituents being capable of reacting or intended to react with one another, at least in part, during the different phases of manufacture of the composition, in particular during the chemical crosslinking thereof.

In the present description, unless expressly indicated otherwise, all the percentages (%) are percentages by weight. Furthermore, any interval of values denoted by the expression "between a and b" represents the range of values extending for more than a to less than b (that is to say, limits a and b excluded) while any interval of values denoted by the expression "from a to b" means the range of values extending from a up to b (that is to say, including the strict limits a and b).

The unit of amount "phr" means parts by weight per hundred parts of elastomer.

Preparation of the Aqueous Dispersion (C)

The first stage of the process according to the invention consists in preparing a stable and homogeneous aqueous dispersion (C) from one or more elastomer latexes (A) with one or more aqueous dispersions of fillers (B).

Stable aqueous dispersion is understood to mean, within the meaning of the present invention, a dispersion in which the constituents of this dispersion do not coagulate, do not flocculate, do not comprise agglomerates and do not settle out, at least at the macroscopic level, that is to say that its state does not change over a predetermined time at ambient temperature and at atmospheric pressure.

More particularly, the stable dispersion does not change at the macroscopic level over time in comparison with the spontaneous coagulation resulting from the mixing of carbon black and a natural rubber latex.

Diene Elastomer Latex (A)

Elastomer in the latex form is understood to mean, within the meaning of the present invention, an elastomer provided in the form of elastomer particles dispersed in water.

The invention relates to diene elastomer latexes, the diene elastomers being defined as follows:

"Diene" elastomer or rubber should be understood as meaning, in a known way, an elastomer resulting at least in part (i.e., a homopolymer or a copolymer) from diene monomers (monomers carrying two carbon-carbon double bonds which may or may not be conjugated).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content of units of diene origin, always less than 15%). In the category of "essentially unsaturated" diene elastomers, "highly unsaturated" diene elastomer is understood to mean in particular a diene elastomer having a content of units of diene origin (conjugated dienes) which is greater than 50%.

Furthermore, among these diene elastomers, a distinction is made between natural rubber and synthetic elastomers.

Natural rubber (NR), which is particularly suitable for the invention, exists in different forms, as described in detail in Chapter 3, "Latex concentrates: properties and composition", by K. F. Gaseley, A. D. T. Gordon and T. D. Pendle, in "Natural Rubber Science and Technology", A. D. Roberts, Oxford University Press, 1988.

In particular, several forms of natural rubber latex are commercially available: natural rubber latexes, referred to as field latexes, concentrated natural rubber latexes, epoxidized latexes (ENR), deproteinized latexes, latexes which have been subjected to an amide bond cleavage stage, or prevulcanized latexes. Field natural rubber latex is a latex to which ammonia has been added in order to prevent premature coagulation and concentrated natural rubber latex corresponds to a field latex which has been subjected to a treatment corresponding to washing, followed by concentrating. The various categories of concentrated natural rubber latex are listed in particular in Standard ASTM D 1076-06. Among these concentrated natural rubber latexes, a distinction is made in particular between concentrated natural rubber latexes of HA (high ammonia) grade and those of LA grade; use may advantageously be made, for the invention, of concentrated natural rubber latexes of HA grade.

The latex can be used directly or can be diluted beforehand in water in order to facilitate the use thereof.

Synthetic diene elastomers capable of being used in accordance with the invention diene elastomer is understood to mean more particularly:

(a)—any homopolymer obtained by polymerization of a conjugated diene monomer having from 4 to 12 carbon atoms;

(b)—any copolymer obtained by copolymerization of one or more conjugated dienes with one another or with one or more vinylaromatic compounds having from 8 to 20 carbon atoms;

(c)—a ternary copolymer obtained by copolymerization of ethylene and of an α-olefin having from 3 to 6 carbon atoms with a non-conjugated diene monomer having from 6 to 12 carbon atoms, such as, for example, the elastomers obtained from ethylene and propylene with a non-conjugated diene monomer of the abovementioned type, such as, in particular, 1,4-hexadiene, ethylidenenorbornene or dicyclopentadiene;

(d)—a copolymer of isobutene and of isoprene (butyl rubber) and also the halogenated versions, in particular chlorinated or brominated versions, of this type of copolymer.

The following are suitable in particular as conjugated dienes: 1,3-butadiene, 2-methyl-1,3-butadiene, 2,3-di($C_1$-$C_5$ alkyl)-1,3-butadienes, such as, for example, 2,3-dimethyl-1,3-butadiene, 2,3-diethyl-1,3-butadiene, 2-methyl-3-ethyl-1,3-butadiene or 2-methyl-3-isopropyl-1,3-butadiene, an aryl-1,3-butadiene, 1,3-pentadiene or 2,4-hexadiene. The following, for example, are suitable as vinylaromatic compounds: styrene, ortho-, meta- or para-methylstyrene, the "vinyltoluene" commercial mixture, para-(tert-butyl)styrene, methoxystyrenes, chlorostyrenes, vinylmesitylene, divinylbenzene or vinylnaphthalene.

The copolymers can comprise between 99% and 20% by weight of diene units and between 1% and 80% by weight of vinylaromatic units. The elastomers can have any microstructure which depends on the polymerization conditions used, in particular on the presence or absence of a modifying and/or randomizing agent and on the amounts of modifying and/or randomizing agent employed. The elastomers can, for example, be block, random, sequential or microsequential elastomers and can be prepared in dispersion or in solution; they can be coupled and/or star-branched or also functionalized with a coupling and/or star-branching or functionalization agent. For coupling with carbon black, mention may be made, for example, of functional groups comprising a C—Sn bond or of aminated functional groups, such as aminobenzophenone, for example; for coupling with a reinforcing inorganic filler, such as silica, mention may be made, for example, of silanol or polysiloxane functional groups having a silanol end (such as described, for example, in FR 2 740 778 or U.S. Pat. No. 6,013,718, and WO 2008/141702), of alkoxysilane groups (such as described, for example, in FR 2 765 882 or U.S. Pat. No. 5,977,238), of carboxyl groups (such as described, for example, in WO 01/92402 or U.S. Pat. No. 6,815,473, WO 2004/096865 or US 2006/0089445) or of polyether groups (such as described, for example, in EP 1 127 909 or U.S. Pat. No. 6,503,973, WO 2009/000750 and WO 2009/000752). Mention may also be made, as other examples of functionalized elastomers, of elastomers (such as SBR, BR, NR or IR) of the epoxidized type.

The following are suitable: polybutadienes, in particular those having a content (mol %) of 1,2-units of between 4% and 80% or those having a content (mol %) of cis-1,4-units of greater than 80%, polyisoprenes, butadiene/styrene copolymers and in particular those having a Tg (glass transition temperature (Tg, measured according to ASTM D3418) of between 0° C. and −70° C. and more particularly between −10° C. and −60° C., a styrene content of between 5% and 60% by weight and more particularly between 20% and 50%, a content (mol %) of 1,2-bonds of the butadiene part of between 4% and 75% and a content (mol %) of trans-1,4-bonds of between 10% and 80%, butadiene/isoprene copolymers, in particular those having an isoprene content of between 5% and 90% by weight and a Tg of −40° C. to −80° C., or isoprene/styrene copolymers, in particular those having a styrene content of between 5% and 50% by weight and a Tg of between −5° C. and −50° C. In the case of butadiene/styrene/isoprene copolymers, those having a styrene content of between 5% and 50% by weight and more particularly of between 10% and 40%, an isoprene content of between 15% and 60% by weight and more particularly between 20% and 50%, a butadiene content of between 5% and 50% by weight and more particularly of between 20% and 40%, a content (mol %) of 1,2-units of the butadiene part of between 4% and 85%, a content (mol %) of trans-1,4-units of the butadiene part of between 6% and 80%, a content (mol %) of 1,2-plus 3,4-units of the isoprene part of between 5% and 70% and a content (mol %) of trans-1,4-units of the isoprene part of between 10% and 50%, and more generally any butadiene/styrene/isoprene copolymer having a Tg of between −5° C. and −70° C., are suitable in particular.

To sum up, the synthetic diene elastomer or elastomers according to the invention are preferably chosen from the group of the highly unsaturated diene elastomers consisting of polybutadienes (abbreviated to "BRs"), synthetic polyisoprenes (IRs), butadiene copolymers, isoprene copolymers and the mixtures of these elastomers. Such copolymers are more preferably chosen from the group consisting of butadiene/styrene copolymers (SBRs), isoprene/butadiene copolymers (BIRs), isoprene/styrene copolymers (SIRs) and isoprene/butadiene/styrene copolymers (SBIRs).

Thus, as synthetic elastomer latex, the latex can in particular consist of a synthetic diene elastomer already available in the emulsion form (for example, a copolymer of butadiene and of styrene, SBR, prepared in emulsion) or of a synthetic diene elastomer initially in solution (for example an SBR prepared in solution) which is emulsified in a mixture of organic solvent and water, generally using a surface-active agent.

A latex of SBR, in particular an SBR prepared in emulsion ("ESBR") or an SBR prepared in solution ("SSBR"), more particularly an SBR prepared in emulsion, is particularly suitable for the invention.

There exists two main types of processes for the emulsion copolymerization of styrene and of butadiene, one of them, or hot process (carried out at a temperature of approximately 50° C.), being suitable for the preparation of highly branched SBRs while the other, or cold process (carried out at a temperature which can range from 15° C. to 40° C.), makes it possible to obtain more linear SBRs.

For a detailed description of the effectiveness of several emulsifiers which can be used in the said hot process (as a function of the contents of the said emulsifiers), reference may be made, for example, to the two papers by C. W. Carr, I. M. Kolthoff and E. J. Meehan, University of Minnesota, Minneapolis, Minn., which appeared in the Journal of Polymer Science in 1950, Vol. V, No. 2, pp. 201-206, and in 1951, Vol. VI, No. 1, pp. 73-81.

As regards comparative examples of implementation of the said cold process, reference may be made, for example, to the paper Industrial and Engineering Chemistry, 1948, Vol. 40, No. 5, pp. 932-937, E. J. Vandenberg, G. E. Hulse, Hercules Powder Company, Wilmington, Del., and to the paper Industrial and Engineering Chemistry, 1954, Vol. 46, No. 5, pp. 1065-1073, J. R. Miller and H. E. Diem, B. F. Goodrich Chemical Co., Akron, Ohio.

In the case of an SBR (ESBR or SSBR) elastomer, use is made in particular of an SBR having a moderate styrene content, for example of between 20% and 35% by weight, or a high styrene content, for example from 35 to 45%, a content of vinyl bonds of the butadiene part of between 15% and 70%, a content (mol %) of trans-1,4-bonds of between 15% and 75% and a Tg of between −10° C. and −55° C.; such an SBR can advantageously be used as a mixture with a BR preferably having more than 90% (mol %) of cis-1,4-bonds.

It should be noted that it is possible to envisage using one or more natural rubber latexes as a blend, one or more synthetic rubber latexes as a blend or a blend of one or more natural rubber latexes with one or more synthetic rubber latexes.

According to a preferred embodiment of the invention, the process employs an aqueous natural rubber dispersion and more particularly a concentrated natural rubber latex and in particular a concentrated natural rubber latex of "HA" (high ammonia) grade or of "LA" grade. More particularly, the concentrated natural rubber latex of "HA" (high ammonia) grade is used.

The concentration of natural rubber in the aqueous dispersion (A) ranges from 10 to 65% by weight, preferably from 30 to 65% by weight and in particular from 40 to 65% by weight, with respect to the total weight of the dispersion.

Stable Aqueous Dispersion of One or More Fillers (B)

Stable aqueous dispersion, as defined above for the aqueous dispersion (C), is understood to mean a dispersion in which the constituents of this dispersion, that is to say the fillers, do not coagulate, do not flocculate, do not comprise agglomerates and do not settle out, at least at the macroscopic level, that is to say that its state does not change over a predetermined time at ambient temperature and at atmospheric pressure.

Filler, within the meaning of the present invention, is understood to mean a chemical entity which will be present in the dispersion (B) and will be added to the aqueous dispersion of diene elastomer latex (A) in order to form the dispersion (C). Thus, this term can denote an unmodified chemical entity, such as carbon black, or else a modified chemical entity, such as hydrophobized silica.

Use may be made of any type of reinforcing filler known for its abilities to reinforce a rubber composition which can be used for the manufacture of tires.

Preferably, the fillers according to the invention coagulate spontaneously with the diene elastomer.

Whatever the chemical nature of the filler, the preferred fillers according to the invention coagulating spontaneously with the diene elastomer have surface properties comparable to those of unmodified carbon black, that is to say a surface energy comparable to that of carbon black. These fillers can be chosen from a reinforcing organic filler, such as carbon black, a chemically modified reinforcing inorganic filler, such as hydrophobized silica, a chemically modified reinforcing organic filler, a hybrid organic/inorganic filler, a polymer-based filler and their mixtures, these fillers all coagulating spontaneously with the diene elastomer latex.

Preferably, the fillers are chosen from carbon black, carbon black modified by organic functional groups, carbon black treated with silica and silica modified by organic functional groups.

For example, it is possible to use a blend of two types of different fillers, in particular a blend of carbon black and of modified inorganic filler.

According to a first embodiment, the filler is an organic filler.

Organic Fillers

The organic filler which can be used in the aqueous dispersion (B) according to the invention is preferably carbon black.

All known carbon blacks, in particular blacks of the HAF, ISAF and SAF types, conventionally used in tires ("tire-grade" blacks) are suitable as carbon blacks. Mention may more particularly be made, among the latter, of reinforcing carbon blacks of the 100, 200 or 300 series (ASTM grades), such as, for example, the N115, N134, N234, N326, N330, N339, N347 and N375 blacks.

Use may also be made, according to the applications targeted, of blacks of higher series FF, FEF, GPF and SRF, for example the N660, N683 and N772 blacks. Mention may be made, as examples of organic fillers other than carbon blacks, of functionalized polyvinylaromatic organic fillers, such as described in Applications WO-A-2006/069792 and WO-A-2006/069793, such as, for example, hydrophobic polyvinylaromatic fillers.

According to a second embodiment, the filler is a modified inorganic filler.

Unmodified Inorganic Fillers

"Reinforcing inorganic filler" according to the invention should be understood, in the present patent application, by definition, as meaning any inorganic or mineral filler (whatever its colour and its origin (natural or synthetic)), also known as "white filler", "clear filler" or indeed even "non-black filler", in contrast to carbon black, capable of reinforcing by itself alone, without means other than an intermediate coupling agent, a rubber composition intended for the manufacture of tires, in other words capable of replacing, in its reinforcing role, a conventional tire-grade carbon black. In the context of the present invention, such a filler is characterized by its hydrophilic nature, that is to say, generally, in a known way by the presence of hydroxyl (—OH) groups at its surface.

The physical state under which the reinforcing inorganic filler is provided is not important, whether it is in the form of a powder, of microbeads, of granules, of beads or any other appropriate densified form. Of course, reinforcing inorganic filler is also understood to mean mixtures of different reinforcing inorganic fillers, in particular of siliceous and/or aluminous fillers as described below.

Mention may be made, as silica, of precipitated, fumed or colloidal silica. Mention may be made, as inorganic filler, of silica ($SiO_2$), alumina ($Al_2O_3$), alumina monohydrate ($Al_2O_3.H_2O$), aluminium hydroxide [$Al(OH)_3$], aluminium carbonate [$Al_2(CO_3)_3$], magnesium hydroxide [$Mg(OH)_2$], magnesium oxide (MgO), magnesium carbonate ($MgCO_3$), talc ($3MgO.4SiO_2.H_2O$), attapulgite ($5MgO.8SiO_2.9H_2O$), titanium dioxide ($TiO_2$), titanium black ($TiO_{2n-1}$), calcium oxide (CaO), calcium hydroxide [$Ca(OH)_2$], aluminium magnesium oxide ($MgO.Al_2O_3$), clay ($Al_2O_3.2SiO_2$), kaolin ($Al_2O_3.2SiO_2.2H_2O$), pyrophyllite ($Al_2O_3.4SiO_2.H_2O$), bentonite ($Al_2O_3.4SiO_2.2H_2O$), aluminium silicate ($Al_2SiO_5.Al_4(SiO_4)_3.5H_2O$), magnesium silicate ($Mg_2SiO_4.MgSiO_3$), calcium silicate ($Ca_2SiO_4$), aluminium calcium silicate ($Al_2O_3.CaO.2SiO_2$), calcium magnesium silicate ($CaMgSiO_4$), calcium carbonate ($CaCO_3$), zirconium oxide ($ZrO_2$), zirconium hydroxide [$ZrO(OH)_2.nH_2O$], zirconium carbonate [$Zr(CO_3)_2$], and crystalline aluminosilicates comprising hydrogen atoms compensating for the charges of the alkali metals or alkaline earth metals, such as zeolites, and their mixture.

Mineral fillers of the siliceous type, in particular silica ($SiO_2$), or of the aluminous type, in particular alumina ($Al_2O_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably from 30 to 400 $m^2/g$. Mention will be made, as precipitated silicas, for example, of the Ultrasil 7000 and Ultrasil 7005 silicas from Degussa, the Zeosil 1165MP, 1135MP and 1115MP silicas from Rhodia, the Hi-Sil EZ150G silica from PPG, the Zeopol 8715, 8745 and 8755 silicas from Huber and silicas having a high specific surface, such as described in Application WO 03/16837.

In contrast to carbon black, the unmodified reinforcing inorganic filler does not coagulate spontaneously with natural rubber. In the specific case of silica, the silica aggregates are typically hydrophilic and have more affinity with the water than with the elastomer particles themselves.

Nevertheless, various solutions have been provided in order to make it possible to obtain the coagulation and good dispersion of this reinforcing inorganic filler in the elastomeric matrix in the liquid phase.

Thus, it is necessary to surface modify the reinforcing inorganic filler in order to create the necessary affinity between the filler particles and the elastomer particles. The ability of the filler to coagulate with the elastomer originates from its surface properties.

In point of fact, it has been observed, surprisingly, that the presence of a hydrophobic reinforcing inorganic filler within the aqueous dispersion (B) makes possible the coagulation of the aqueous dispersion (C).

Modification to the Reinforcing Inorganic Filler

In order to render hydrophobic the unmodified reinforcing inorganic filler according to the invention, there is grafted, to the particle, one or more hydrophobing agents of the following formula (I):

$$E_n\text{-}F \quad \text{(Formula I)}$$

in which:

n is an integer equal to 1 or 2, when n has the value 1, then F is a monovalent group, when n has the value 2, then F is a divalent group, E represents a functional group which is capable of bonding physically and/or chemically to the filler and which comprises, in its structure, at least one alkyl or alkylene chain comprising from 1 to 18 carbon atoms which confers hydrophobing properties on the group E, F represents a group which may or may not bond physically and/or chemically to the diene elastomer.

Advantageously, the hydrophobing agent is of the following formula (II):

$$[G_{(3-m)}(L\text{-}K)_m Si\text{-}L\text{-}]_n\text{-}F \quad \text{(II)}$$

with:

when n has the value 1, then F denotes the K group defined below and m varies from 0 to 2, and when n has the value 2, then F denotes an amino group, a polysulphide (Sx) group or an epoxy group and m varies from 0 to 2, and for which the G groups are chosen, independently of one another, from a hydrogen atom, a $C_1$-$C_{18}$ hydrocarbon group chosen from linear, branched or cyclic alkyl groups, aralkyl groups, alkylaryl groups and aryl groups, such as a phenyl, a benzyl, a cyclopentyl, a cyclohexyl, an alkoxy ($R_1$O)— group, in which $R_1$ represents a saturated $C_1$-$C_8$ alkyl radical, such as, for example, the methyl, ethyl and isopropyl groups, preferably at least one methyl and ethyl group, a halogen atom, such as fluorine, chlorine, bromine and iodine, and a hydroxyl group, provided that at least one G group is chosen from an alkoxy group, a chlorine atom or a hydroxyl group, L denotes a saturated or unsaturated and linear, branched or cyclic $C_1$-$C_{18}$ alkylene radical, preferably of 1 to 8 carbon atoms, such as, for example, the methylene, ethylene, isopropylene, n-butylene, octadecylene, phenylene, cyclopentylene and cyclohexylene groups, optionally comprising an oxygen atom, K denotes a hydrogen atom, a halogen atom, such as fluorine, chlorine, bromine and iodine, or a functional group chosen from an amino group, a polyaminoalkyl group, a mercapto group, an epoxy group, a hydroxyl group, a vinyl group, an acryloxy group, a methacryloxy group, an —SCN group or an R(CO)S— group with R being a $C_1$-$C_{18}$ alkyl group.

Preferably, m=0.

Thus, according to a first specific embodiment of the invention, the hydrophobing agent is of following formula (III):

$$G_3Si\text{-}L\text{-}K \quad \text{(III)}$$

with G, L and K being as defined above.

According to a second specific embodiment of the invention, the hydrophobing agent is of following formula (IV):

$$[G_3Si\text{-}L\text{-}]_2\text{-}F \quad \text{(IV)}$$

with G, L and F being as defined above.

Preferably, the hydrophobing agent is chosen from chlorotrimethylsilane, chlorotriethylsilane, chlorotripropylsilane, bromotrimethylsilane, bromotriethylsilane, bromotripropylsilane, fluorotrimethylsilane, methoxytrimethylsilane, methoxytriethylsilane, methoxytripropylsilane, chlorotrimethylsilane, dichlorodimethylsilane, trichloromethylsilane, bromotrimethylsilane, dibromodimethylsilane, tribromomethylsilane, methoxytrimethylsilane, dimethoxydimethylsilane, trimethoxymethylsilane, tetramethoxysilane, trimethoxypropylsilane, trimethoxyoctylsilane, trimethoxyhexadecylsilane, dimethoxydipropylsilane, triethoxymethylsilane, triethoxypropylsilane, triethoxyoctylsilane, diethoxydimethylsilane, octenyldimethylchlorosilane, (γ-aminopropyl)trimethoxysilane, (γ-aminopropyl)triethoxysilane, (gamma-hydroxypropyl)tripropoxysilane, (γ-mercaptopropyl)triethoxysilane, (γ-aminopropyl)dimethylethoxysilane, (γ-aminopropyl)dihydroxymethoxysilane, (glycidylpropyl)trimethoxysilane, [γ-(N-aminoethyl)aminopropyl]triethoxysilane, (γ-methacryloxypropyl)triethoxysilane, (γ-methacryloxypropyl)trimethoxysilane, (β-mercaptoethyl)triethoxysilane, [γ-(N-aminoethyl)propyl]trimethoxysilane, (N-methylaminopropyl)trimethoxysilane, (γ-thiocyanatopropyl)triethoxysilane, bis-(3-triethoxythiopropyl)silane tetrasulphide, vinyltriethoxysilane, vinylphenylmethylsilane, vinyldimethylmethoxysilane, divinyldimethoxysilane, divinylethyldimethoxysilane, dimethylvinylchlorosilane and their mixture.

Mention should in particular be made, among the known alkoxysilane polysulphide compounds, of bis(3-triethoxysilylpropyl)tetrasulphide (abbreviated to "TESPT"), of formula $[(C_2H_5O)_3Si(CH_2)_3S_2]_2$, sold in particular by Degussa under the name "Si69", in the form of a commercial mixture of polysulphides $S_x$ with a mean value for x which is approximately 4.

According to a preferred embodiment of the invention, the hydrophobing agent is chosen from octenyldimethylchlorosilane, bis(3-triethoxysilylpropyl)tetrasulphide and their mixture.

According to the invention, one of the alkoxy groups or the halogen atom carried by the silane will react with a silanol group present at the surface of the silica, when the unmodified filler according to the invention is silica.

Advantageously, the filler is hydrophobized silica.

Preferably, the hydrophobing agent, once attached to the reinforcing inorganic filler, comprises at most 30 carbon atoms and more particularly from 1 to 25 carbon atoms.

Hydrophobized filler is understood to mean, within the meaning of the present invention, a reinforcing inorganic filler which carries sufficient hydrophobing agents to make possible the coagulation of the filler with the elastomer.

Preferably, the hydrophobized filler is characterized by a degree of hydrophobation of greater than or equal to 0.29 carbon atoms carried by the hydrophobing agent, one attached to the filler, per $nm^2$ of filler surface area.

Preferably, the degree of hydrophobation ranges from 0.29 to 0.73 carbon atoms/$nm^2$ of surface area.

The BET specific surface of a filler is generally measured in a way known per se according to the Brunauer-Emmett-Teller method described in "*The Journal of the American Chemical Society*", Vol. 60, page 309, February 1938, corresponding to Standard ISO 5794/1.

The concentration of fillers in the aqueous dispersion (B) comprising the fillers is preferably between 0.1 and 20% by weight, preferably between 1 and 15% by weight, with respect to the water present in the aqueous filler dispersion (B).

It is known that hydrophobic fillers, in particular carbon black, coagulate spontaneously with natural rubber latexes, that is to say that the coagulation begins virtually instantaneously at the macroscopic level when the carbon black and the latex are brought into contact, under very slight shearing.

In point of fact, it has been observed, surprisingly, that the presence of the surfactant within the aqueous dispersion (B) makes it possible to stabilize the aqueous dispersion (C), that is to say that which results from the mixing of the filler dispersion (B) and of the diene elastomer latex (A), and thus to delay the phase of coagulation of the mixture. Furthermore, it has been observed, with an unvarying supply of mechanical energy introduced into the medium, that the duration of the phase of homogenization of the dispersion (C) is a function of the amount of surfactant present within this dispersion.

This phenomenon has also been observed for an aqueous dispersion (B) of hydrophobized reinforcing inorganic fillers, such as the hydrophobized silica, comprising surfactant; and diene elastomer latex (A). The presence of surfactant within the aqueous dispersion (B) delays the coagulation of the aqueous dispersion (C).

The diene elastomer latex (A) can also comprise one or more surfactants.

Surfactants

Thus, the aqueous filler dispersion (B) comprises one or more surfactants, in particular so as to render it stable.

This surfactant can be anionic, nonionic, cationic or amphoteric.

The nonionic surface-active agents are compounds well known per se (see in particular in this regard "Handbook of Surfactants" by M. R. Porter, published by Blackie & Son (Glasgow and London), 1991, pp 116-178). Thus, they can in particular be chosen from (nonlimiting list) alcohols, α-diols or alkylphenols, these compounds being polyethoxylated and/or polypropoxylated and having a fatty chain comprising, for example, from 8 to 18 carbon atoms, it being possible for the number of ethylene oxide or propylene oxide groups to range in particular from 2 to 50. Mention may also be made of copolymers of ethylene oxide and of propylene oxide or condensates of ethylene oxide and of propylene oxide with fatty alcohols; polyethoxylated fatty amides preferably having from 2 to 30 mol of ethylene oxide; polyglycerylated fatty amides comprising, on average, from 1 to 5 glycerol groups and in particular from 1.5 to 4; oxyethylenated sorbitan fatty acid esters having from 2 to 30 mol of ethylene oxide; polyethoxylated oils preferably having from 2 to 50 mol of ethylene oxide; sucrose fatty acid esters; polyethylene glycol fatty acid esters; alkyl polyglycosides; N-alkylglucamine derivatives, amine oxides, such as ($C_{10}$-$C_{14}$)alkylamine oxides or N-acylaminopropylmorpholine oxides; or oxyethylenated and/or oxypropylenated polydimethylsiloxanes.

The amphoteric or zwitterionic surface-active agent or agents which can be used in the present invention can in particular be optionally quaternized, secondary or tertiary aliphatic amine derivatives in which the aliphatic group is a linear or branched chain comprising from 8 to 22 carbon atoms, the said amine derivatives comprising at least one anionic group, such as, for example, a carboxylate, sulphonate, sulphate, phosphate or phosphonate group. Mention may in particular be made of ($C_{8-20}$) alkyl betaines, sulphobetaines, ($C_{8-20}$ alkyl) amido($C_{3-8}$ alkyl) betaines or ($C_{8-20}$ alkyl)amido($C_{6-8}$ alkyl)sulphobetaines.

Mention may be made, by way of example, of the cocoamphodiacetate, sold by Rhodia under the trade name Miranol® C2M Concentrate.

Use is preferably made, among the abovementioned amphoteric or zwitterionic surface-active agents, of ($C_{8-20}$ alkyl) betaines, such as coco betaine, ($C_{8-20}$ alkyl) amido ($C_{3-8}$ alkyl) betaines, such as cocoamidopropyl betaine, and their mixtures. More preferably, the amphoteric or zwitterionic surface-active agent or agents are chosen from cocoamidopropyl betaine and coco betaine.

"Anionic surface-active agent" is understood to mean a surfactant comprising, as ionic or ionizable groups, only anionic groups. These anionic groups are preferably chosen from $CO_2H$, $CO_2^-$, $SO_3H$, $SO_3^-$, $OSO_3H$, $OSO_3^-$, $H_2PO_3$, $HPO_3^-$, $PO_3^{2-}$, $H_2PO_2$, $HPO_2^-$, $PO_2^{2-}$, $POH$ or $PO^-$ groups.

Mention may be made, as examples of anionic surface-active agents which can be used in the composition of the invention, of alkyl sulphates, alkyl ether sulphates, alkylamido ether sulphates, alkylaryl polyether sulphates, monoglyceride sulphates, alkylsulphonates, alkylamidesulphonates, alkylarylsulphonates, α-olefinsulphonates, paraffinsulphonates, alkyl sulphosuccinates, alkyl ether sulphosuccinates, alkylamide sulphosuccinates, alkyl sulphoacetates, acyl sarcosinates, acyl glutamates, alkyl sulphosuccinamates, acyl isethionates and N-acyltaurates, salts of alkyl monoesters of polyglycoside-polycarboxylic acids, acyl lactylates, D-galactoside-uronic acid salts, alkyl ether carboxylic acid salts, alkylaryl ether carboxylic acid salts, alkylamido ether carboxylic acid salts; and the corresponding nonsalified forms of all these compounds; the alkyl and acyl groups of all these compounds comprising from 6 to 24 carbon atoms and the aryl group denoting a phenyl group.

When the anionic surface-active agent or agents are in the salt form, it/they can be chosen from the alkali metal salts, such as the sodium or potassium salt and preferably the sodium salt, the ammonium salts, the amine salts and in particular amino alcohol salts, or the alkaline earth metal salts, such as the magnesium salt.

Mention may in particular be made, as examples of cationic surfactant, of primary, secondary or tertiary fatty amine salts; quaternary ammonium salts, such as tetraalkylammonium, alkylamidoalkyltrialkylammonium, trialkylbenzylammonium, trialkylhydroxyalkylammonium or alkylpyridinium chlorides or bromides; imidazolium derivatives; or amine oxides having a cationic nature.

Preferably, the surfactant used is chosen from anionic, nonionic or amphoteric surfactants and their mixture.

Preferably, anionic surfactants are used and in particular alkyl sulphates. The particularly preferred surfactant is sodium dodecyl sulphate.

In the aqueous dispersion (B) comprising the fillers, the concentration of surfactant is preferably strictly greater than 0.01% by weight, with respect to the total weight of the aqueous dispersion (B), more particularly strictly greater than 0.1%, more preferably between 0.1 and 20% by weight and more preferably still between 0.1 and 2% by weight, with respect to the total weight of the aqueous dispersion (B).

Preparation of the Aqueous Filler Dispersion (B)

The filler or fillers according to the invention, in particular the carbon black in association with at least one surfactant, are subsequently dispersed in water, preferably so as to obtain a dispersion having a viscosity sufficient to be able to be easily handled.

Advantageously, the dispersion is subjected to ultrasound in order to make it possible to obtain stability of the aggregates in water, which makes it possible to improve the dispersibility of the aqueous filler dispersion in the masterbatch subsequently produced.

According to a third embodiment of the invention, the diene elastomer employed is natural rubber and the filler used is hydrophobized silica.

According to a fourth embodiment of the invention, the diene elastomer employed is natural rubber and the organic filler used is carbon black. This embodiment is preferred.

Bringing the Two Dispersions into Contact and Homogenization Phase

The latex of the diene elastomer (A) and the stable filler dispersion (B) are brought into contact. The filler slurry is slowly poured into the elastomer latex, or vice versa, with stirring, preferably slow stirring, so as to ensure good homogenization of the medium. The mixing of the dispersions (A) and (B) can also be carried out simultaneously, the one into the other, with a controlled flow rate can also be envisaged.

As explained above, the presence of the surfactant in the aqueous filler dispersion (B) constitutes a variable parameter which directs the kinetics of the coagulation of the medium, this being done while keeping constant the supply of mechanical energy.

The process according to the invention thus makes it possible to control, indeed even to be in command of, the coagulation of the medium. The control of the duration of the phase of homogenization of the latex and of the slurry makes it possible to directly influence the homogeneity of the medium and of the final masterbatch.

The more effective the homogenization phase, the more homogeneous the distribution of the fillers in and the coagulum.

Coagulation Phase

Once the homogenization has been carried out, the coagulation phase arrives.

The coagulation can be brought about by introducing, to the system, a sufficient supply of mechanical energy. For example, a significant increase in the shear rate can be applied to the medium. According to other embodiments, it is also possible to compress the system. This supply of mechanical energy will simultaneously destabilize the whole volume and bring about the coagulation of the medium.

Another possibility is to leave the medium under an unchanging supply of mechanical energy, that is to say a supply identical to the supply used during the homogenization phase, for example by retaining an unchanging shear rate for these two phases: homogenization and coagulation.

Thus, once the surfactant no longer makes it possible to stabilize the dispersion (C), then the latter tends to coagulate.

When the mechanical energy introduced into the system is applied in the form of action of the shearing, static mixers or else dynamic mixers, such as paddle stirrers, can be used.

It is possible to use any type of device which makes possible "efficient" mixing of two products in the liquid phase; thus, it will be possible to use a static mixer, such as those sold by Noritake Co. Limited, TAH in the USA, Koflo in the USA or Tokushu Kika Kogyo Co. Ltd, or a mixer which produces high shear, such as mixers sold by Tokushu Kika Kogyo Co. Ltd, by PUC in Germany, by Cavitron in Germany or by Silverson in the United Kingdom.

During the phase of coagulation of these two dispersions, a coagulum of elastomer and of filler is formed, either in the form of just one solid component in the solution or in the form of several separate solid components.

The volume of aqueous dispersion of the filler (B) depends on the filler content targeted for the masterbatch to be produced, on the volume of the diene elastomer latex (A) and on their respective concentrations.

Thus, the volume will consequently be adjusted. Advantageously, the filler content targeted for the masterbatch is between 10 and 150 phr, preferably between 10 and 100 phr, more preferably between 15 and 90 phr and more preferably still between 15 and 70 phr.

Preferably, the process according to the invention does not comprise the addition of a coagulating agent. It is the supply of the mechanical energy to the system which brings about the coagulation.

Thus, the amount of mechanical energy introduced into the system and the content of surfactant present in the aqueous dispersion (C) are two parameters which make possible the control of the kinetics of the homogenization and coagulation phases.

According to another embodiment, it is possible to add one or more coagulating agents to the dispersion (C), so as to improve the yield of the coagulation stage. Should this happen, the coagulating agent is not the factor responsible for the triggering of the coagulation.

Recovery of the Solid Form

The solid or solids are recovered, for example, by filtration or by centrifuging. This is because the filtering operation, which can be carried out using a filtration sieve, may prove to be unsuitable when the coagulum exists in the form of numerous small solid components. In such a case, an additional centrifuging operation is preferably carried out.

On conclusion of this filtering or centrifuging stage, the coagulum obtained is dried, for example in an oven.

The process according to the invention can be carried out both continuously and batchwise.

Additives

The diene elastomer latex (A) in accordance with the invention and the aqueous filler dispersion (B) in accordance with the invention can also comprise all or a portion of the usual additives generally used in elastomer compositions intended for the manufacture of tires, in particular treads, such as, for example, plasticizers or extending oils, whether the latter are aromatic or nonaromatic in nature, pigments, protection agents, such as antiozone waxes, chemical antiozonants, antioxidants, antifatigue agents, reinforcing resins, methylene acceptors (for example phenolic novolak resin) or methylene donors (for example, HMT or H3M), such as are described, for example, in Application WO 02/10269, a crosslinking system based either on sulphur or on sulphur donors and/or on peroxides and/or on bismaleimides, vulcanization accelerators or vulcanization activators, with the exception, of course, of zinc-based activators (or in accordance with the 0.5 phr maximum for zinc in the composition, and preferably less than 0.3 phr).

Preferably, these dispersions comprise, as preferred nonaromatic or very slightly aromatic plasticizing agent, at least one compound chosen from the group consisting of naphthenic oils, paraffinic oils, MES oils, TDAE oils, glycerol esters (in particular trioleates), plasticizing hydrocarbon resins exhibiting a high Tg preferably of greater than 30° C., and the mixtures of such compounds.

The diene elastomer latex (A) and the aqueous filler dispersion (B) can also comprise coupling agents, coupling activators, covering agents for the reinforcing inorganic filler or more generally processing aids capable, in a known way, by virtue of an improvement in the dispersion of the inorganic or organic filler in the rubber matrix and of a lowering of the viscosity of the compositions, of improving their property of processing in the raw state, these agents being, for example, hydrolyzable silanes, such as alkylalkoxysilanes (in particular alkyltriethoxysilanes), polyols, polyethers (for example polyethylene glycols), primary, secondary or tertiary amines (for example trialkanolamines), hydroxylated or hydrolyzable POSs, for example α,ω-dihydroxypolyorganosiloxanes (in particular α,ω-dihydroxypolydimethylsiloxanes), or fatty acids, such as, for example stearic acid.

The additives described above might also be incorporated in a masterbatch before the coagulation phase and/or after the formation of the coagulum.

The invention also relates to a masterbatch of diene elastomer and of filler prepared according to the process described above.

Another subject-matter of the invention is a rubber composition based on at least one masterbatch of diene elastomer and of filler prepared according to the process described above.

The rubber compositions of the invention are manufactured in appropriate mixers using two successive preparation phases according to a general procedure well known to a person skilled in the art: a first phase of thermomechanical working or kneading (sometimes referred to as "nonproductive" phase) at high temperature, up to a maximum temperature of between 130° C. and 200° C., preferably between 145° C. and 185° C., followed by a second phase of mechanical working (sometimes described as "productive" phase) at a low temperature, typically of less than 120° C., for example between 60° C. and 100° C., finishing phase during which the crosslinking or vulcanization system is incorporated.

According to a preferred embodiment of the invention, all the base constituents of the compositions of the invention, with the exception of the vulcanization system, namely the masterbatch, and optional additives of the masterbatch, if appropriate, are intimately incorporated, by kneading, in the diene elastomer during the first "non-productive" phase, that is to say that at least these various base constituents are introduced into the mixer and that kneading is carried out thermomechanically, in one or more stages, until a maximum temperature of between 130° C. and 200° C., preferably of between 145° C. and 185° C., is reached.

By way of example, the first (non-productive) phase is carried out in a single thermomechanical stage during which all the necessary constituents, the optional additional covering agents or processing aids and various other additives, with the exception of the vulcanization system, are introduced into an appropriate mixer, such as a normal internal mixer. The total duration of the kneading, in this non-productive phase, is preferably between 1 and 15 min. After cooling the mixture thus obtained during the first non-productive phase, the vulcanization system is then incorporated at low temperature, generally in an external mixer, such as an open mill; everything is then mixed (productive phase) for a few minutes, for example between 2 and 15 min.

The vulcanization system proper is preferably based on sulphur and on a primary vulcanization accelerator, in particular on an accelerator of the sulphenamide type. Various known vulcanization activators or secondary accelerators, with the exception of zinc and any zinc derivative, such as ZnO, or while observing a zinc content of the composition of less than 0.5 phr and preferably of less than 0.3 phr, such as, for example, fatty acids, such as stearic acid, guanidine derivatives (in particular diphenylguanidine), and the like, can come to be added to this vulcanization system, being incorporated during the first non-productive phase and/or during the productive phase. The sulphur content is preferably between 0.5 and 3.0 phr and the content of the primary accelerator is preferably between 0.5 and 5.0 phr.

The final composition thus obtained is subsequently calendered, for example in the form of a sheet or of a plaque, in particular for laboratory characterization, or else extruded in the form of a rubber profiled element which can be used, for example, as a tire tread for a passenger vehicle.

The invention also relates to the use of surfactant for delaying the phase of coagulation of the aqueous dispersion (C).

The invention also relates to a finished or semifinished article comprising a composition as defined above.

The invention also relates to a tire tread comprising a composition as defined above.

Finally, a subject-matter of the invention is a tire or semifinished product provided with at least one rubber composition as defined above.

The following examples serve to illustrate the invention without, however, exhibiting a limiting nature.

EXAMPLES OF THE IMPLEMENTATION OF THE INVENTION

Equipment Used

Model VCX500 Vibracell ultrasound generator (ref. Fischer W75042) with a power of 500 W, used at 60% of its maximum power.

Standard sonication probe having a diameter of 13 mm, suitable for the sonication of volumes of between 10 and 250 ml (ref. Fischer W75482).

Controlled shear rate rheometer (Rheometrix RFSII) of cone/plate geometry and having a diameter of 50 mm (the plate being made of stainless steel RFSII-ES-SP50, cone RFSII-TC50.04), a distance between the rotor and the stator of 45 μm and a sample volume of approximately 3 ml. The temperature is maintained between 23±2° C. during the measurements, in a water bath at unchanging temperature. A solvent seal is used to minimize the evaporation of the water (liquid petrolatum VWR24679.921).

1 magnetic stirrer+1 magnetic bar.

Glassware: beakers with a size of 15 ml (ref. VWRN 15 ml 213-3916) and 50 ml (ref. VWR 50 ml 212-9301).

Reactants:

High Ammonia concentrated natural rubber latex comprising 60% by weight of natural rubber originating from Trang Latex Co. Ltd, Thailand.

Carbon black N234 powder.

Silica powder ground with a mortar, Zeosil silica (Z 1165MP from Rhodia), with a BET specific surface of 160 m$^2$/g.

Distilled water.

Sodium dodecyl sulphate (SDS) originating from Aldrich.

1. Evaluation of the Value of the Characteristic Time τ as a Function of the Shear Rate Masterbatch Prepared The reactants used to prepare the masterbatch appear in the following table. The contents of reactants are expressed in g %.

| Aqueous dispersion (C) | 1 |
|---|---|
| Natural rubber | 20 |
| Carbon black | 5.14 |
| SDS | 0.53 |
| Distilled water | q.s. for |

The masterbatch 1 is prepared according to a process in accordance with the invention and in the following way.

Preparation of the Natural Rubber Latex: Latex (A)

The natural rubber latex is weighed out into a glass beaker. A magnetic bar is added thereto. It is subsequently diluted in distilled water up to a concentration of 40% by weight of natural rubber.

Preparation of the Carbon Black Slurries: Aqueous Filler Dispersions (B)

After having weighed out the black, the water and the surfactant (sodium dodecyl sulphate, denoted SDS), the reactants are brought into contact in a 50 ml glass beaker (low form).

The combined mixture is then homogenized twice using an ultrasound probe, for 2 minutes. The carbon black agglomerated on the probe at the end of the 2 minutes is incorporated in the mixture using a spatula.

Preparation of the Masterbatches

The aqueous dispersion (B) is gently stirred before mixing with the dispersion (A), in order to minimize possible effects of sedimentation of the fillers. A volume of aqueous dispersion (B) is slowly poured into one and the same volume of aqueous dispersion (A) with manual stirring using a spatula, resulting in the aqueous dispersion (C) 1 described in the above table.

The sample is placed in the rheometer, the cone subsequently being carefully and manually placed over it, so as not to induce shear forces before the measurement.

Evaluation of the Characteristic Time $\tau$

The characteristic time $\tau$ is measured according to the following method. The change in the viscosity over time is measured for a sample at a given shear rate, for example at 500 $s^{-1}$ in FIG. 1, over intervals of 10 seconds, alternating with intervals of 80 seconds, during which the dynamic properties were measured at a maximum degree of strain of 0.2% and at a frequency of 1 Hz.

Figure 1:
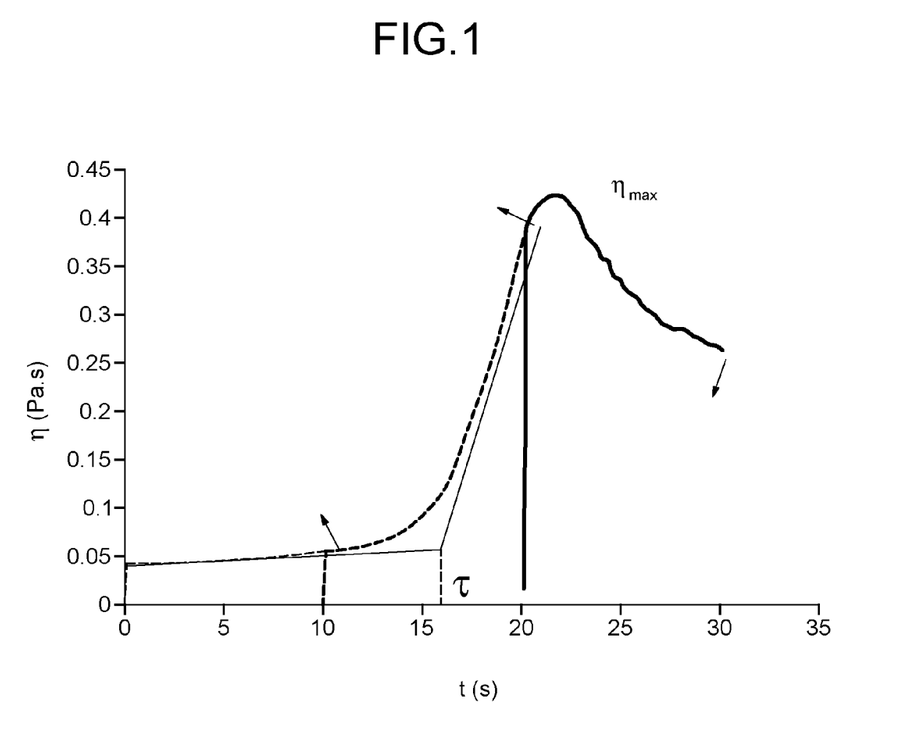
FIG. 1 is a graph illustrating change in viscosity of a sample aqueous dispersion (C) 1 over time.

The viscosity of the sample increases very greatly under the effect of the shearing, reflecting the sudden destabilization of the aqueous dispersion (C) 1. Moreover, small elastic solids appear between the rotor and the stator of the rheometer at the end of the measurement.

FIG. 1 illustrates the change in the viscosity over time. The characteristic time $\tau$ is calculated by linear extrapolation both of the initial viscosity plateau and of the rapid rise during the coagulation. The characteristic time $\tau$ is determined at the intersection of these two extrapolated curves, as shown in FIG. 1.

Measurement of the Characteristic Time $\tau$ at Different Shear Rates

The aqueous dispersion (C) 1 is placed in the rheometer. A series of measurements of the characteristic time $\tau$ before coagulation is carried out using the dispersion 1 for several shear rates: 200, 300, 400 and 500 $s^{-1}$. The values obtained, taking into account an estimation of the standard deviation, are given in FIG. 2.

Figure 2:
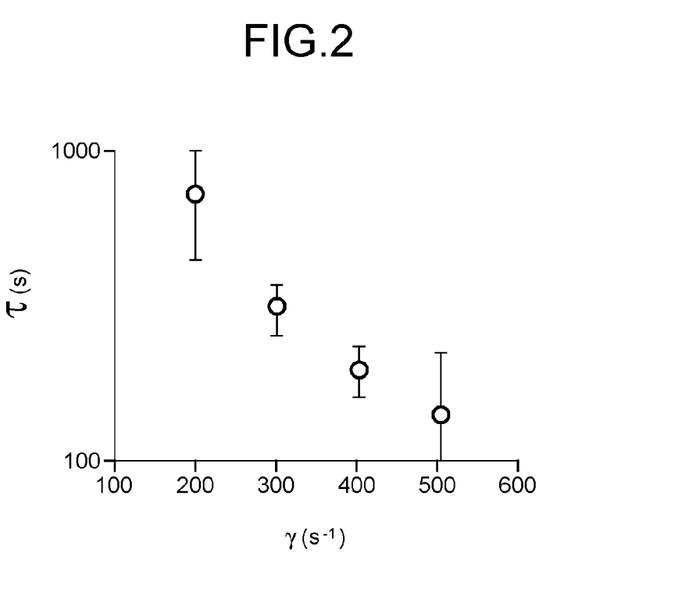
FIG. 2 is a graph illustrating characteristic time of the sample aqueous dispersion (C) 1 before coagulation as a function of shear rate.

FIG. 2 shows the characteristic time $\tau$ as a function of the shear rate. In order to avoid possible rearrangements of aggregates of carbon black and of natural rubber, which might influence the medium and thus the results, all the measurements were carried out a few seconds after mixing.

Conclusion

These results show that, the higher the shear rate applied to the dispersion (C), the more the value of the characteristic time $\tau$ decreases.

Thus, these tests show that the supply of mechanical energy directly influences the duration of the homogenization phase preceding the coagulation phase.

2. Evaluation of the Value of the Characteristic Time $\tau$ as a Function of the Concentration of Surfactant with Carbon Black as Filler Masterbatches Prepared The reactants used to prepare the masterbatches appear in the following table. The contents of reactants are expressed in g %.

| Aqueous dispersions (C) | 2 | 3 | 4 |
|---|---|---|---|
| Natural rubber | 20 | 20 | 20 |
| Carbon black | 5.15 | 5.14 | 5.13 |
| SDS | 0.50 | 0.55 | 0.61 |
| Distilled water | q.s. | q.s. | q.s. |

The masterbatches 2 to 4 are prepared according to a process in accordance with the invention and according to the protocol described above.

Evaluation of the Characteristic Time $\tau$

A shear rate of 100 $s^{-1}$ is applied for each of the mixtures 2 to 4 and the characteristic time before coagulation is measured. The measurements appear in the table below.

| Aqueous dispersions (C) | 2 | 3 | 4 |
|---|---|---|---|
| $\tau$ (s) | <50 | 150-250 | 500-800 |

Conclusion

These results show that, the greater the amount of surfactant present in the aqueous dispersion (C), the higher the value of the characteristic time $\tau$, thus resulting in a delay in the coagulation of the medium.

Thus, these examples show that the duration of the homogenization phase preceding the coagulation phase can be controlled by the amount of surfactant present in the aqueous dispersion (C) and by the mechanical energy introduced into the aqueous dispersion (C).

The beginning of the coagulation phase can also be controlled by an additional supply of mechanical energy.

3. Evaluation of the Value of the Characteristic Time $\tau$ as a Function of the Concentration of Surfactant with Hydrophobized Silica as Filler Preparation of the Hydrophobized Silica The silica is ground to give a fine powder using a pestle and mortar. The hydrophobicity of the silica is adjusted by silanization of its surface with octenyldimethylchlorosilane (ODCS).

The hydrophobized silica is prepared by reacting 5 g of hydrophilic silica with 0.08 g of ODCS in the presence of 50 g of toluene, resulting in a hydrophobized silica, the degree of hydrophobation of which is 0.29 carbon atom/nm² of filler surface area.

The 0.08 g of ODCS is dissolved in toluene. The medium is stirred using a magnetic stirrer. The ground silica powder is added to the medium and the dispersion is left stirring for 2 minutes. The composition is placed in a Petri dish (with a diameter of 18.5 cm) and is placed at a temperature of 70° C. for one hour, so as to make possible the evaporation of the toluene. The powder obtained is dispersed in distilled water after sonication for two minutes.

Masterbatches Prepared

A masterbatch is prepared according to a process in accordance with the invention and in the following way.

The reactants used to prepare the masterbatches appear in the following table. The contents of reactants are expressed in g.

| Aqueous dispersions (C) | 5 | 6 | 7 |
|---|---|---|---|
| 60% natural rubber latex | 3.3 | 3.3 | 3.3 |
| Hydrophobized silica | 3.3 | 3.3 | 3.3 |
| SDS | 0.008 | 0.010 | 0.012 |
| Distilled water | q.s. | q.s. | q.s. |

Preparation of the Aqueous Dispersion (A) of Natural Rubber Latex

The natural rubber latex is weighed out into a glass beaker, a magnetic bar is added thereto and the latex is subsequently diluted in distilled water down to a concentration of 60% by weight of natural rubber.

Preparation of the Aqueous Filler Dispersion (B)

2.32 g of hydrophobized silica as prepared above are dispersed in 20 ml of water. The combined mixture is then homogenized using an ultrasound probe for two minutes. The silica agglomerated on the probe at the end of the two minutes is incorporated in the mixture using a spatula.

Preparation of the Masterbatch 3.3 g of aqueous dispersion (B) are introduced into a 15 ml beaker with a magnetic stirrer. The appropriate amount of sodium dodecyl sulphate is added thereto. The medium is stirred using a magnetic bar at 700 rpm for 30 seconds, in order to homogenize the dispersion (B). 3.3 g of the aqueous dispersion (A) are then added to the medium. This operation is carried out for the different amounts of sodium dodecyl sulphate of the compositions 5 to 6.

Evaluation of the Characteristic Time τ

A shear rate of 700 rpm is applied for each of the mixtures 5 to 7 and the characteristic time before coagulation is measured. The measurements appear in the table below.

| Aqueous dispersions (C) | 5 | 6 | 7 |
|---|---|---|---|
| τ (s) | <50 | 100 | 425 |

Conclusion

These results show that, the greater the amount of surfactant present in the aqueous dispersion (C), the higher the value of the characteristic time τ, thus resulting in a delay in the coagulation of the medium.

Thus, these examples show that the duration of the homogenization phase preceding the coagulation phase can be controlled by the amount of surfactant present in the aqueous dispersion (C) and by the mechanical energy introduced into the aqueous dispersion (C).

The invention claimed is:

1. A process for the preparation of a masterbatch in the liquid phase based on one or more diene elastomer latexes and on one or more fillers, comprising:
   preparing a stable and homogeneous aqueous dispersion (C) by mixing
   one or more diene elastomer latexes (A) with
   one or more stable aqueous dispersions (B) comprising one or more surfactants and one or more fillers,
   homogenizing the aqueous dispersion (C),
   coagulating within the aqueous dispersion (C) the diene elastomer latex or latexes (A) with the filler or fillers by supplying mechanical energy,
   recovering the coagulum,
   drying the recovered coagulum in order to obtain the masterbatch.

2. The process according to claim 1, wherein the recovering the coagulum is carried out by a filtering operation.

3. The process according to claim 1, wherein the recovering the coagulum is carried out by a centrifuging operation.

4. The process according to claim 1 wherein the diene elastomer latex (A) is a natural rubber latex.

5. The process according to claim 4, wherein the diene elastomer latex (A) is a concentrated natural rubber latex.

6. The process according to claim 1, wherein the filler coagulates spontaneously with the said diene elastomer latex or latexes (A).

7. The process according to claim 6, wherein the filler is carbon black.

8. The process according to claim 6, wherein the filler is hydrophobized silica.

9. The process according to claim 1, wherein the surfactant is an anionic surfactant.

10. The process according to claim 9, wherein the surfactant is sodium dodecyl sulphate.

11. The process according to claim 1, wherein the concentration of surfactant in the aqueous dispersion (B) is strictly greater than 0.01% by weight, with respect to the total weight of the aqueous dispersion (B).

* * * * *